Sept. 29, 1936.  C. A. CAMPBELL  2,055,967

AIR BRAKE

Original Filed Feb. 17, 1932  2 Sheets—Sheet 1

Inventor

Charles A. Campbell

Attorneys

Sept. 29, 1936.  C. A. CAMPBELL  2,055,967

AIR BRAKE

Original Filed Feb. 17, 1932  2 Sheets-Sheet 2

Inventor
Charles A. Campbell
By
Attorneys

Patented Sept. 29, 1936

2,055,967

UNITED STATES PATENT OFFICE 2,055,967

AIR BRAKE

Charles A. Campbell, Watertown, N. Y., assignor to The New York Air Brake Company, a corporation of New Jersey Application February 17, 1932, Serial No. 593,635
Renewed July 7, 1936

31 Claims. (Cl. 303—38)

This invention relates to triple valves and particularly to quick service venting mechanism.

It has heretofore been proposed to associate with the triple valve a measuring chamber and to cause the triple valve to move through a quick service position in its travel toward service position, the valve functioning in quick service position and usually also in service position, to vent the brake pipe into the measuring chamber which at that time was closed from atmosphere.

In the earliest form of this mechanism the measuring chamber was vented to atmosphere when the triple valve returned to release position, from which fact it followed that quick service venting could not be repeated without releasing the brakes. The function of the quick service vent is to accelerate the propagation of the service pressure wave throughout the length of the brake pipe. It is obviously desirable to do this not only in the first reduction but also in successive service reductions without release. To accomplish this result it has been proposed to vent the measuring chamber not only in release position but also in lap position of the triple valve.

Prior efforts to apply the principle have not met with practical success for the reason that when the engineer makes the first reduction at the engineer's brake valve, and laps his valve, the pressure in the brake pipe does not remain constant, but, on the contrary, is gradually reduced by leakage. The gradual reduction of brake pipe pressure as a result of brake pipe leakage, causes the valves to creep toward service position and in valves as heretofore constructed, this creeping opened the quick service vents and initiated an undesired service reduction throughout the brake pipe. For this reason repeater type quick service mechanisms have not met with commercial adoption.

The prime object of the present invention is to illustrate several practicable ways in which repeated quick service vent can be had, without risk of undesired quick service action.

A further object of the invention is to embody this feature in a quick service mechanism of the type in which the quick service valve is operated by a piston distinct from the triple piston, and is controlled in its action by a port in the triple valve.

The advantage of the latter arrangement is that it permits the use of a relatively large quick service port, which will give rapid quick service venting, without requiring the use of objectionably large ports in the triple valve itself.

Another and further object of the present invention is to disclose, in a valve such as just described the optional use of means for venting the measuring chamber into the brake cylinder rather than to atmosphere, when the triple valve is in lap position. In certain classes of service this arrangement is desirable for the reason that since the brake cylinder is under pressure at the time the measuring chamber is vented into it, the measuring chamber is not completely vented and is less completely vented after each successive brake pipe reduction because of increased brake cylinder pressure. Consequently such a valve offers maximum quick service venting on the first reduction, and progressively reduced quick service venting on successive reductions.

An incidental advantage is that some of the air vented to the measuring chamber is usefully applied.

The preferred embodiments of the invention are illustrated in the accompanying drawings, in which,—

In the various figures, parts which are essentially identical bear similar numbers. The drawings are diagrammatic to the extent that the ports are drawn as if they all lay in a single plane. The customary bushings for the cylinder and valve chamber are not illustrated, it being understood that the valve can be constructed in any of the conventional ways familiar to those skilled in the art.

Referring first to Figs. 1 to 5, the body of the triple valve is indicated at 16 and is formed with a flange 17 by means of which it is supported on the usual triple valve mount, the mount being ported to afford connections with the brake pipe, brake cylinder and auxiliary reservoir as usual. Such pipeless mounts are well known in the art.

Figures 1, 2, 3, 4, 5, 11, 13:
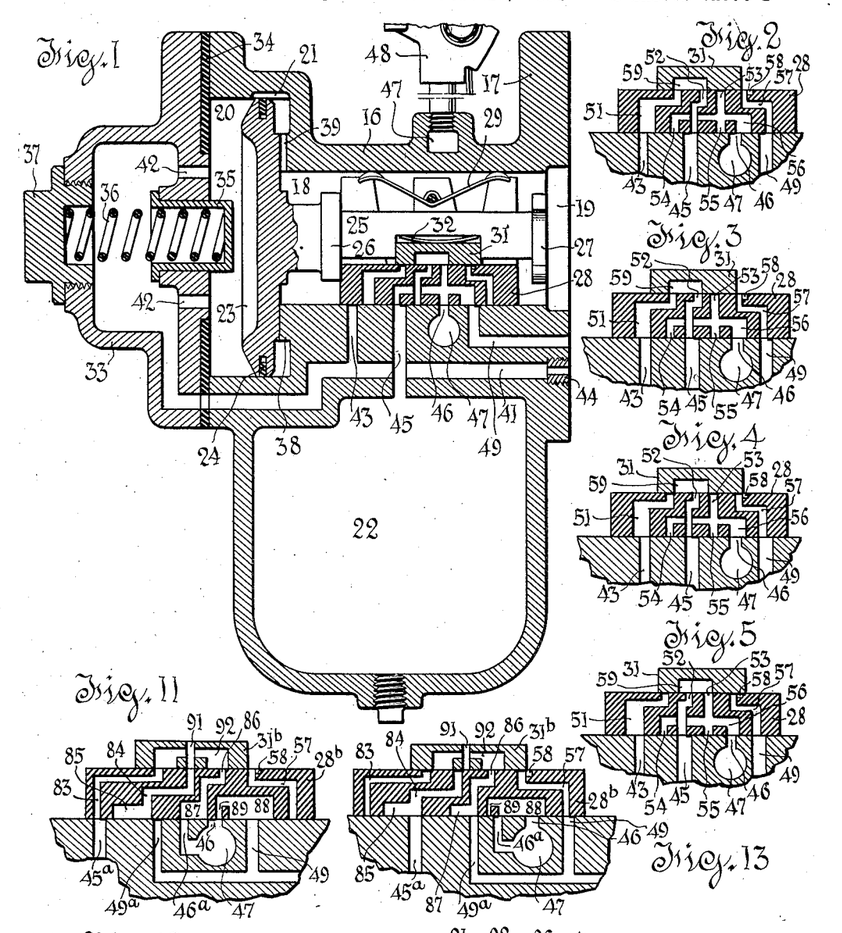
Fig. 1 is a vertical axial section through a triple valve embodying the invention, the embodiment being of the simplest type in which the triple valve has a single release position, and in which the quick service flow takes place through the slide valve and graduating valves. The parts are shown in release position.
Fig. 2 is a fragmentary view showing the graduating valve, slide valve and seat, with the valves in quick service position.
Fig. 3 is a similar view showing the valves in full service position.
Fig. 4 is a similar view showing the valves in preliminary lap position, a position in which the triple valve is stabilized, by gradual flow from the auxiliary reservoir to the brake cylinder, against movement to quick service position as the result of brake pipe leakage.
Fig. 5 is a similar view showing the valves in lap position.
Figs. 11 to 14 correspond to Figs. 7 to 10, but show a modified form of graduating valve, slide valve, and seat, which might be used in the triple valve structure of Fig. 6, the valves being so ported that in lap position the quick service chamber is vented to the brake cylinder. Otherwise this valve is functionally similar to that shown in Figs. 6 to 10 inclusive.

The body 16 is formed with the usual slide valve chamber 18, which is open at the right hand end, as indicated at 19 to communicate with the auxiliary reservoir passage in the mount. Coaxial with the chamber 18 is the cylinder 20 which is formed with the usual feed groove 21. Also formed in the body 16 is the quick service measuring chamber 22. The triple piston is shown at 23 and has the usual packing ring 24 and stem 25. The stem 25 is provided with a collar 26 and a guiding spider 27 between which the slide valve 28 has lost motion less than the travel of the piston. The slide valve 28 is held seated by the usual bow-spring 29.

Riding on the slide valve is the graduating valve 31 which is fitted in a notch in the stem 25 and is closely confined so that it partakes of all the motions of the piston 23. It is held to its seat by a leaf-spring 32. There is the usual front cap 33 which is bolted to the body 16 and makes a tight joint therewith by means of the gasket 34. This gasket 34 projects inward far enough to serve as a seat for the piston 23. The front cap 33 is provided with a guideway for a cup-shaped graduating stop 35 which is urged inward by a graduating spring 36 confined between the graduating stop 35 and a recessed plug 37 threaded into the cap 33. The graduating stop is so positioned that it serves to arrest the piston 23 momentarily, at which time the parts are in the so-called quick service position of Fig. 2, and then yields to permit the piston 23 to move to its limit of motion and seat against the gasket 34, at which time the parts are in the position of Fig. 3.

It will be observed that the ports are so dimensioned that there is no functional distinction between quick service and service position (compare Figs. 2 and 3) but it is not essential that this arrangement be used. Motion of the graduating stop inward (to the right) is so limited that on fall of auxiliary reservoir pressure relatively to brake pipe pressure, the stop will assist in restoring the piston 23 until the parts are in the preliminary lap position of Fig. 4. From preliminary lap position (Fig. 4) to lap position (Fig. 5) the piston moves solely as a result of preponderance of brake pipe pressure over auxiliary reservoir pressure. In its release position the piston 23 seats against a shoulder 38 at the limit of its inward motion. The charging flow to the auxiliary reservoir occurs through a slot 39 formed in the shoulder.

The brake pipe passage is indicated at 41 and leads through ports 42 to the space on the outer (left hand side) of the piston 23. There is a branch port 43 leading from the passage 41 to the seat of the slide valve 28.

The choke 44 is threaded into the end of passage 41 and serves to limit the flow between the passage 41 and the brake pipe. The purpose of this choke is to cause the brake pipe drop, occasioned by venting into the chamber 22 in quick service, to act sharply on the piston 23. Consequently, the choke might be located at any convenient point between the brake pipe and branch port 43.

There is a port 45 leading from the seat of slide valve 28 to the measuring chamber 22 and an exhaust port 46 which leads from the seat of the slide valve 28 to an exhaust passage 47. The exhaust passage 47 is the brake cylinder exhaust passage and is customarily controlled by a retainer, indicated at 48. The brake cylinder port is indicated at 49. The slide valve is provided with a brake pipe quick service port 51 which leads through the valve from top to bottom, and which is enlarged at its lower end so that it registers with a port 43 both in quick service and service position. As the slide valve does not shift between service and lap positions, this registry is maintained in preliminary lap and lap positions, but in the latter two positions the port is blanked by the graduating valve and consequently is devoid of function.

There is also a quick service chamber port 52 which extends through the slide valve from top to bottom, and which is so dimensioned relatively to the seat port 45 that the two ports register in quick service, service and lap positions, in each of which this registration permits the performance of a useful function. They also register in preliminary lap position but at that time the port 52 is blanked.

There is also formed in the slide valve 28 an exhaust port which has four branches, namely, a branch 53 which terminates on the upper face of the slide valve, and three branches 54, 55, and 56, which terminate on the lower face of the slide valve. In normal release position the branch 55 registers with the exhaust port 46 in the seat, while the branches 54, and 56 register respectively with the chamber port 45 and the brake cylinder port 49. Consequently, in release position both the brake cylinder and the measuring chamber are exhausted to atmosphere through the brake cylinder exhaust port. As this is controlled by the retainer 48, it will be observed that the closing of the retainer will serve to hold the retained pressure in chamber, and this reduces the effectiveness of quick service venting while retainers are applied. Only the first brake pipe reduction following the application of retainers will be free from effect by the retainers.

In quick service position, full service position and preliminary lap position, the exhaust flows just described are cut off, but in lap position the exhaust ports perform a useful function which will be described.

There is a service port 57 which extends through the slide valve 28 from top to bottom, and which at its upper end is formed with a restricted lateral extension or tail port 58. The upper end of the service port 57 is blanked in release position and lap position by the graduating valve and is fully exposed by the graduating valve in quick service and service positions. In preliminary lap position (Fig. 4) only the restricted tail port 58 is exposed by the graduating valve. Since the graduating stop 35 becomes inactive as the graduating valve moves inward, when the position shown in Fig. 4 is reached, the piston and graduating valve are free to move back and forth between lap and preliminary lap position without engaging the graduating stop 35.

The graduating valve is provided on its lower face with a single recess 59 so located that when the graduating valve 31 is at its left hand limit of motion, recess 59 connects the upper ends of ports 51 and 52, while, when the graduating valve is in its right hand position it connects the upper ends of ports 52 and 53. Thus in service and quick service positions recess 59 serves to connect the ports 51, 52, which at that time are in register with ports 43 and 45. Consequently, the brake pipe is vented directly into the measuring chamber 22.

In preliminary lap position the graduating valve 31 is in intermediate position so that it interrupts the two connections which it makes respectively in its two limiting positions. In lap position it connects the port 52 with the extension 53 of the exhaust port, thus connecting the chamber port 45 with the exhaust port 46.

*Operation of structure of Figs. 1 to 5*

In release position the charging flow occurs from the brake pipe through the charging groove 21 to the auxiliary reservoir. On a service reduction of brake pipe pressure, the piston 23 moves outward (to the left) shifting first the graduating valve and then the slide valve, which reach the position shown in Fig. 2 when the piston 23 engages the stop 35. Here they are momentarily arrested. The service port 57 is fully open and in register with the brake cylinder port 49 so that flow to the brake cylinder starts immediately. The brake pipe passage 41 is vented through ports 51, 59, 52 and chamber port 45 to the measuring chamber 22. This produces a definite drop of brake pipe pressure, the effect of which, on the piston 23, is accentuated by the presence of the choke 44. This sharp drop of pressure, acting on the piston 23, causes it to move to the left until it seats on gasket 34, such motion overpowering the spring 36. The parts are then positioned as shown in Fig. 3, the ports remaining connected as in Fig. 2.

When auxiliary reservoir pressure, falling as the result of flow to the brake cylinder, approaches equalization with brake pipe pressure, the spring 36 and stop 35 will shift the piston 23 toward release position, the action of the stop ceasing when the parts reach the preliminary lap position shown in Fig. 4. In this position the quick service chamber is isolated. Exhaust from the brake cylinder has been cut off and service flow is limited to the capacity of the restricted tail port 58. Gradual flow of auxiliary reservoir air to the brake cylinder will further reduce auxiliary reservoir pressure until a point is reached at which preponderating brake pipe pressure will shift the valve to lap position (Fig. 5) in which the service port is completely blanked. As soon as the graduating valve 31 starts toward the position of Fig. 5 from the position of Fig. 4, the measuring chamber 22 is vented to atmosphere.

If the engineer maintains his brake valve in lap position and brake pipe leakage occurs, the piston 23 will start outward shifting graduating valve 31. Before quick service position is reached the parts will arrive in preliminary lap position (Fig. 4) in which the tail port 58 is again opened. The capacity of this port is so chosen that it will reduce auxiliary reservoir pressure by flow to the brake cylinder at a rate which equals, and preferably slightly exceeds, the rate of brake pipe pressure reduction caused by the maximum permissible brake pipe leakage.

From this arrangement it follows that the piston 23 will stop at preliminary lap position and will tend to graduate to adjust the flow from the auxiliary reservoir to keep pace with brake pipe leakage.

The structure just described is the simplest embodiment of the operative principle, and can, without difficulty, be modified to include restricted recharge and release positions and emergency position by the addition of conventional features well understood in the art, and omitted from Figs. 1 to 5 in the interest of simplicity and clearness.

In some cases it is undesirable to have the quick service venting flow take place through the slide valve, for the reason that it involves rather large port openings in the lower face of the slide valve, which, being open to low pressure, increase the differential pressure holding the slide valve to its seat, and consequently increase the friction of the slide valve.

Figures 6, 7, 9:
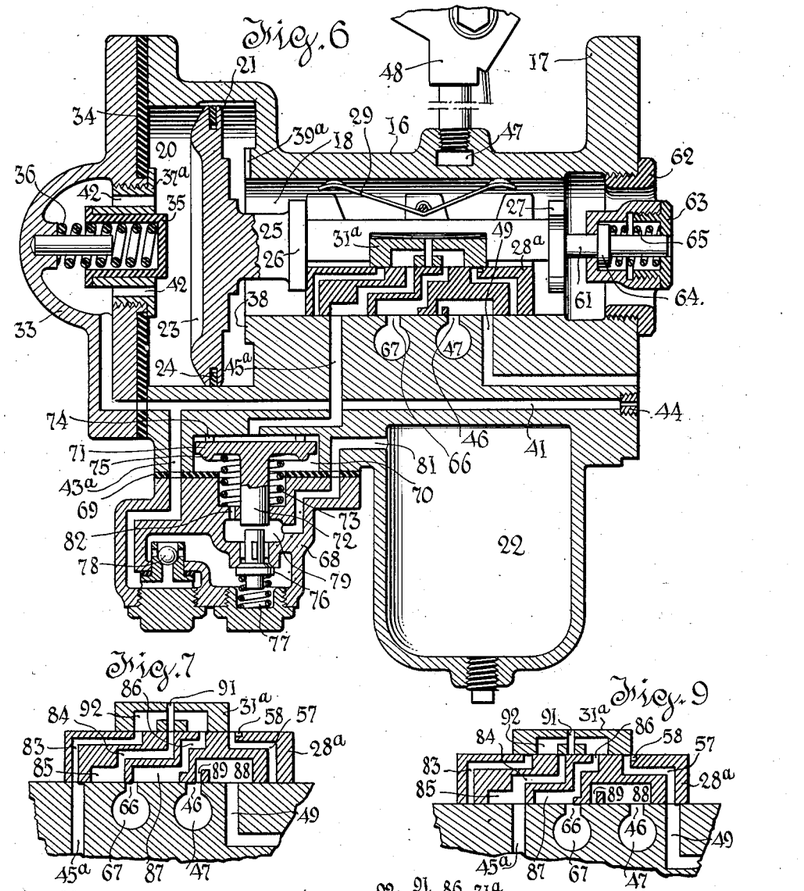
Fig. 6 is a view similar to Fig. 1 showing the application of the invention to a modified type of triple valve having two release positions and so arranged that the venting flow from the brake pipe to the measuring chamber in quick service occurs through a special quick service valve actuated by a quick service piston controlled by the quick service port in the triple valve itself. The parts are shown in normal release position.
Fig. 7 is a fragmentary view of the graduating valve, slide valve and seat, showing the parts in normal recharge position after restricted release.
Fig. 9 is a similar view showing the parts in preliminary lap position.

In those instances where increased friction is undesirable, recourse may be had to the structure shown in Fig. 6 in which the quick service venting flow from the brake pipe to the measuring chamber is controlled by a piston-actuated quick service valve distinct from the triple valve and controlled by a port in the triple slide valve.

In the valve shown in Fig. 6 the venting of the measuring chamber in lap and release positions is controlled directly by the triple slide valve. In Fig. 6 an opportunity has been taken to illustrate a valve of the type having a normal release and recharge position and a restricted release and recharge position.

In the valve of Fig. 6 there are components corresponding to similarly numbered components in Fig. 1. Where the structure differs in a way to involve functional differences the subscript $a$ is used, that is to say, the slide valve 28$a$ and the graduating valve 31$a$ bear the same relation to the piston 25 as do the similarly numbered parts in Fig. 1, but they are differently ported. There is no plug 37, but instead the graduating stop 35 is guided in a threaded plug 37$a$ in which the ports 42 are formed. The two arrangements are functionally equivalent and are used merely to permit assembly of the spring and stop. The boss 38 is the same in both structures, but the groove 39$a$ is restricted and has the function of limiting charging flow in the position known as restricted recharge and release.

To arrest the triple piston in normal release and recharge position use is made of a retard stop 61 which is guided in a ported nut 62 at its forward end and at its rear end in a plug or nut 63 screwed into the nut 62. The stop 61 is formed with a collar or flange 64 which not only limits the outward (left hand) motion of the stop 61, but also serves as a spring seat for the retard stop spring 65 which is sustained at its opposite end by the nut 63.

The seat for the slide valve 28a has a brake cylinder port 49 and is also formed with an exhaust port 46 which leads to the exhaust passage 47 controlled by the retainer 48. There is also an independent exhaust port 66 which leads to an independent exhaust passage 67. This passage connects directly with atmosphere, and hence is not controlled by the retainer.

Opportunity has been taken in Fig. 6 to illustrate the use of the independent exhaust port. This arrangement is preferred where it is not desired to have the retainers limit the venting of the measuring chamber 22. There is a fourth port in the seat for the slide valve 28a known as the quick service chamber seat port and indicated by the numeral 45a. This port is analogous to the port 45 in two respects. When it is opened by the slide valve in quick service and service position, quick service venting is caused to take place. Further it serves as the passage through which the chamber 22 is vented.

There is a quick service branch passage 43a extending from the brake pipe passage 41, and this leads to a quick service mechanism formed partly in a separate body 68 bolted to the body 16 and sealed thereto by means of gasket 69.

Formed in the body 16 is a quick service cylinder 70, with the upper end of which the quick service chamber port 45a communicates. Mounted in the cylinder 69 and making a loose and leaky fit therein, is a quick service piston 71. This is provided with a stem 72 which serves to guide the piston and also to center a compression spring 73 which urges the piston to its upper limit of motion. This upper limit is defined by stand-off lugs 74. This function is to prevent the piston from sealing against the upper end of cylinder 70. In its lowermost position the piston seals against the gasket 69, a bead 75 being provided in the lower face of the piston to insure a tight seal.

When the piston is in its lowermost position, it forces downward and hence opens a quick service valve 76. This is shown as of the check type and closes in the direction of flow from the brake pipe toward the chamber 22. It is urged closed by brake pipe pressure and by a compression spring 77. Brake pipe pressure reaches the valve 76 by way of the passage 43a and quick service port check valve 78. This check valve is interposed to prevent back flow to the brake pipe either from the measuring chamber 22 or from the auxiliary reservoir. The air flowing from the brake pipe past valve 76 enters the chamber 79 and then flows by way of a port 81 to the chamber 22. A port 82 connects chamber 79 with the space below the piston 71.

The slide valve 28a and graduating valve 31a, are identical with the slide valve and graduating valve 28 and 31 in one respect, namely, the slide valve has a through service port 57, (see Fig. 7) provided with a restricted tail port 58 at its upper end and this service port and tail port are controlled in exactly the manner described with reference to Figs. 1 to 5.

In addition to the service port just described, the slide valve 28a has a through port 83 which functions in the innermost (restricted release) position of slide valve 28a to provide a vent from the chamber 22. It has no other function. There is a through port 84 having a longitudinal enlargement 85 at its lower end. This port functions in normal release position to form part of the venting passage for the quick service chamber, and functions in quick service and service positions to form part of the passage through which auxiliary reservoir air is admitted to act on the upper side of the piston 71. It also functions in lap position as a part of the passing for venting flow from the quick service measuring chamber.

There is another through port 86 having a longitudinal enlargement 87 at its lower end. This serves in release position and in lap position as a portion of the venting flow path from the measuring chamber to atmosphere. It is without function in service, quick service and preliminary lap positions.

There is on the lower face of the slide valve 28a an exhaust cavity 88 having a restricted extension or tail port 89. This functions only in normal release position (Fig. 6) when the cavity 88 offers a free connection between the brake cylinder port 49 and the exhaust port 46, and in restricted release position (see Fig. 7) in which the cavity 88 and restricted tail port 89 in series offer a restricted connection between the brake cylinder port 49 and the exhaust port 46 to produce a restricted release of the brakes. It should be observed that the retard stop does not shift the slide valve, so that after the piston has moved the graduating valve to restricted release position it remains there but the piston moves back with the graduating valve to normal recharge position. It should also be observed that in moving from normal recharge and release position of Fig. 6, quick service position is reached by the motion of the piston and graduating valve alone, but if the slide valve 28a has been moved to restricted release position (see Fig. 7) both the slide valve and the graduating valve must be moved. Consequently, those valves which have moved to restricted release position are stabilized in some degree against motion to quick service position, as compared to those valves which have moved only to normal release and recharge position.

The graduating valve 31a has a central through port 91 which when the graduating valve is in its right hand position relatively to the slide valve 28a, is blanked, and which, when the graduating valve is in its left hand position, relatively to the slide valve, communicates with the upper end of the port 84. The slide valve is also formed with a cavity 92 which in the right hand position of the valve 31a connects the upper ends of the ports 84 and 86, and which in the left hand position of the valve 31a connects the upper ends of the ports 83 and 86.

Operation of structure of Figs. 6 to 10

In normal release position the release and recharge are normal, as will be observed. The chamber 22 is exhausted to atmosphere by way of passage 81, chamber 79, port 82, leakage past the piston 71, which is in its uppermost position, thence by passage 45a, port 84, cavity 92, port 86, exhaust port 66 to atmosphere.

On cars at the forward end of the train rapid brake pipe rise shifts the piston inward, overpowering the spring 65. As the slide valve moves to restricted release position, the piston assumes restricted recharge position, but ultimately, upon approximate equalization of brake pipe and auxiliary reservoir pressure, the piston moves back to normal recharge position, and the parts are in the position of Fig. 7.

The motion of the slide valve 28a to restricted release position, substitutes the port 83 for the port 84 as to register with the port 45a and when the piston 23 moves back to normal recharge position the cavity 92 connects ports 83 and 86. Consequently the chamber 22 is vented as before except that the flow from 45a is by way of 83, 92, 86 to exhaust port 66.

Figure 8:
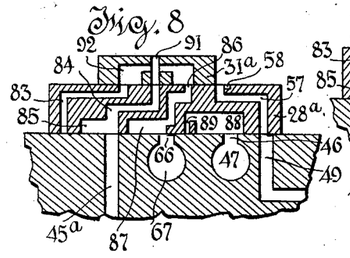
Fig. 8 is a similar view showing the parts in service position.

Upon a service reduction of brake pipe pressure the piston 23 moves outward. If it starts from normal release position it moves only the graduating valve 31a, but if it moves from normal recharge after restricted release it moves both graduating and slide valves. In either case it reaches quick service position when port 91 is in register with 84 and cavity 85 is in register with port 45a (as it is when the slide valve 28a is in its normal release position).

Auxiliary reservoir air flows through the ports 91, 84, 45a at a rapid rate, greatly exceeding the leakage flow around piston 71. Consequently piston 71 moves downward, compressing spring 73 and sealing against gasket 69. This motion unseats valve 76 so that brake pipe air rushes through ports 41 and 43a, check valve 78, chamber 79, passage 81 to the measuring chamber 22. In this way the pressure in chamber 22 will rise to the point of equalization of brake pipe pressure and the reduction of brake pipe pressure will cause piston 23 to seat against gasket 34. Auxiliary reservoir pressure will be reduced by flow to the brake cylinder through ports 57 and 49, and a point will be reached at which piston 71 will be forced up by spring 73 and pressure in chamber 22. If this should, by any chance, occur while auxiliary reservoir pressure exceeded brake pipe pressure, the check 78 would prevent loss of auxiliary reservoir pressure into the brake pipe. Upward movement of the piston 71 allows valve 76 to close.

As auxiliary reservoir pressure falls and approaches equalization with brake pipe pressure, the graduating stop will, as already described with reference to Figs. 1 to 5, shift the triple valve to preliminary lap position (Fig. 9) in which the service port is throttled, and in which the measuring chamber 22 is sealed.

Figure 10:
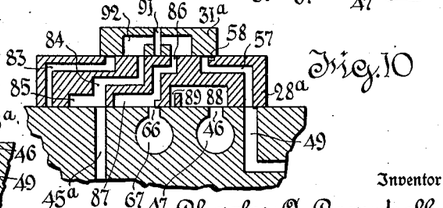
Fig. 10 is a similar view showing the parts in lap position.
Figure 12:
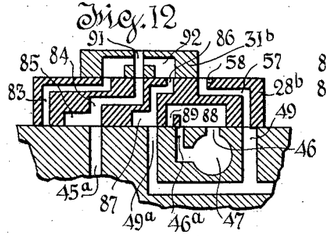
Figure 14:
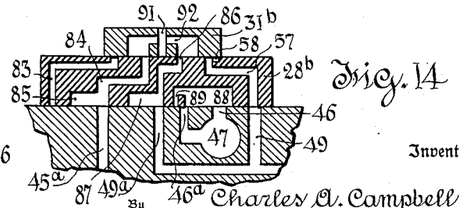

Upon motion further to lap position, as a result of gradual reduction of auxiliary reservoir pressure through flow to the brake cylinder, cavity 92 will connect ports 84 and 86 and the chamber 22 will be vented by way of passage 81, chamber 79, port 82, flow around piston 71, port 45a, port 84, cavity 92, port 86, exhaust port 66. Consequently, in lap position the chamber is vented and conditioned for a second quick service function. However, in moving from lap to preliminary lap position, the piston 23 and graduating valve 31a move freely without engaging the graduating stop, and the restricted tail port 58 establishes a flow from the auxiliary reservoir to the brake cylinder which will reduce the auxiliary reservoir at a rate which will keep pace with the leakage reduction of brake pipe pressure. This and the resistance of the graduating spring, as before, prevent the triple valve from graduating into quick service position.

If it is desired to vent the quick service chamber 22 into the brake cyinder, instead of venting it to atmosphere, as above described, the porting of the seat for the slide valve may be changed, the slide valve 28b and the graduating valve 31b being ported as already described with reference to Figs. 6 to 10 inclusive.

The seat shown in Figs. 11 to 14 has a brake cylinder port 49 which is provided with an extension 49a, which extension takes the place of the port 66 in lap position. The exhaust port 46 has an extension 46a which takes the place of the port 66 in release, and the port 45a remains as before.

In normal release position (which is not shown in the drawings) the left end of the cavity 85 registers with port 45a and the cavity 92 connects it with port 86 just as in Fig. 6. Consequently chamber 22 is vented to atmosphere. In normal release after restricted release (Fig. 11) the chamber is exhausted just as in Fig. 7, the port 83 taking the place of port 84. Quick service is as described with reference to Figs. 6 to 10. In service position the service port 57 is wide open and auxiliary reservoir air is admitted to the passage 45a exactly as described with reference to Fig. 8.

In preliminary lap position (Fig. 13) the chamber 22 is isolated, the flow to the brake cylinder is limited to the capacity of the tail port 58, and the graduating stop has reached its limit of motion just as described with reference to Fig. 9. In lap position, however, (Fig. 14) the port 45a and consequently the measuring chamber 22 is connected to the brake cylinder by way of the port 84, cavity 92, port 86 and brake cylinder port 49a. Consequently, in lap position, the pressure in the measuring chamber 22 is reduced by equalization with brake cylinder pressure. Thus, upon each reduction after the first reduction the chamber is initially at successively increasing pressures. Consequently, the venting of the brake pipe on each successive reduction becomes less until the point of equalization is reached, at which time no venting occurs.

The mechanism described with reference to Figs. 6 to 14 inclusive, may also be modified by the addition of conventional parts which would permit the inclusion of known emergency functions. It is deemed unnecessary to include them in the present disclosure, because they are familiar to persons skilled in the art and are not involved in the quick service functions here under discussion.

The various structures above described in considerable detail, are intended to be illustrative rather than limiting, and it is contemplated that additional modifications may be made within the scope of the invention.

What is claimed is,—

1. The combination with a triple valve of the quick service type, of means for preventing the triple valve from creeping from lap to quick service position, said means comprising a bleed port opened by initial motion from lap position toward quick service position and serving to reduce auxiliary reservoir pressure at a rate which will neutralize the effect of brake pipe leakage on the triple valve; and yielding means initially effective when said bleed port is fully open and before quick service position is reached and serving to resist further motion of said triple valve toward quick service position.

2. The combination with a triple valve including a triple piston, a slide valve actuated with lost motion by said piston, and a graduating valve actuated by said piston, said valves having a quick service position, in which the brake pipe is vented, and a lap position, the graduating valve shifting between said positions while the slide valve remains at rest; of means for preventing the graduating valve and piston from creeping to quick service position as a result of brake pipe leakage, said means including a restricted extension of the service port which is opened by initial motion of the graduating valve toward quick service position in advance of the opening of the service port proper, said extension when open serving to produce a reduction of auxiliary reservoir pressure corresponding to the leakage reduction of brake pipe pressure; and a yielding stop positioned to permit such initial motion of the graduating valve and piston and offer yielding resistance to further motion thereof toward quick service position.

3. The combination of a triple valve of the type having a lap position and a quick service position, the valve functioning upon each successive movement from lap to quick service position to vent the brake pipe; of means rendered effective by initial motion of the triple valve from lap toward quick service position, and before brake pipe venting takes place, to bleed the auxiliary reservoir to the brake cylinder at a rate which will reduce auxiliary reservoir pressure to keep pace with the reduction of brake pipe pressure caused by leakage; and a yielding stop positioned to arrest the triple valve in such auxiliary reservoir bleeding position and capable of yielding to permit it to move to quick service position.

4. The combination with a triple valve of the type including a quick service measuring chamber said triple valve having a lap position in which said measuring chamber is vented and a quick service position in which said measuring chamber is connected with the brake pipe; of means active in an intermediate position of the triple valve between said quick service and lap positions and serving to vent the auxiliary reservoir to the brake cylinder at a rate which will reduce auxiliary reservoir pressure to keep pace with the reduction of brake pipe pressure caused by leakage; and a yielding stop effective to arrest said triple valve in said intermediate position and capable of yielding to permit it to move to quick service position.

5. A triple valve having a piston, a slide valve mechanism and a quick service measuring chamber, said triple valve being adapted for connection to brake pipe, brake cylinder and auxiliary reservoir; said valve mechanism being formed with a service port controlling flow from the auxiliary reservoir to the brake cylinder, a quick service port which when open causes venting of the brake pipe into said measuring chamber, and an exhaust port for said chamber, said exhaust port leading to the brake cylinder connection; said triple valve having a service position in which the service and quick service ports are open, a lap position in which said ports are closed and said exhaust port is open, and a preliminary lap position between service and lap positions in which said quick service port is closed and said service port is throttled.

6. The combination of claim 5 further characterized in that the throttling of the service port is effected by the use of a restricted port extension whose maximum flow capacity will reduce auxiliary reservoir pressure at a rate only slightly exceeding the maximum leakage reduction rate of brake pipe pressure.

7. A triple valve having a piston, a slide valve mechanism, a yielding graduating stop and a quick service measuring chamber, said triple valve being adapted for connection with brake pipe, brake cylinder and auxiliary reservoir; said valve mechanism being formed with a service port controlling flow from the auxiliary reservoir to the brake cylinder, a quick service port controlling flow from the brake pipe to said measuring chamber, and an exhaust port controlling flow from said measuring chamber; said triple valve having a service position in which the graduating stop is overpowered and in which the service and quick service ports are open, a lap position beyond the range of motion of said graduating stop and in which said ports are closed and said exhaust port is open, and a preliminary lap position to which said graduating stop urges said valve, said position being between service and lap positions and being characterized by the fact that the quick service port is closed and the service port is throttled.

8. A triple valve having a piston, a slide valve actuated by said piston with lost motion, a graduating valve actuated by said piston, a quick service measuring chamber, and a yielding graduating stop, said triple valve being adapted for connection with brake pipe, brake cylinder and auxiliary reservoir; said slide valve being formed with a service port controlling flow from the auxiliary reservoir to the brake cylinder, a quick service port controlling flow from the brake pipe to said measuring chamber, and an exhaust port controlling exhaust flow from said measuring chamber, all said ports being controlled by said graduating valve; said triple valve having three positions between which the graduating valve shifts while the slide valve remains substantially at rest, namely: a service position in which the service and quick service ports are open, a lap position in which said ports are closed and said exhaust port is open, and a preliminary lap position between service and lap positions in which said quick service port is closed and said service port is throttled, said yielding graduating stop being so located and so limited in its motion that it assists in shifting said triple valve from service to preliminary lap position, said graduating valve moving independently of said graduating stop between preliminary lap and lap positions.

9. The combination of claim 8 further characterized in that the throttling of the service port is effected by the use of a restricted port extension whose maximum flow capacity will reduce auxiliary reservoir pressure at a rate only slightly exceeding the maximum leakage reduction rate of brake pipe pressure.

10. In a triple valve the combination of a triple piston; a slide valve actuated by said piston and having lost motion relatively to the piston; a graduating valve actuated by the piston; a quick service measuring chamber; and a yielding graduating stop, said triple valve being adapted for connection with brake pipe, brake cylinder and auxiliary reservoir; said slide valve having a service port controlled by the graduating valve and regulating flow from auxiliary reservoir to brake cylinder, a quick service port controlled by said graduating valve and when open causing venting of brake pipe to said measuring chamber, and a port for exhausting said measuring chamber; said triple valve having three positions between which the graduating valve shifts while the slide valve remains substantially at rest, namely: service position in which the service and quick service ports are open and the chamber exhaust port is closed, lap position in which the service and quick service ports are closed and the chamber exhaust port is open, and preliminary lap position in which the quick service port is closed and the service port is throttled, the graduating stop being so located and so limited in its motion that the graduating valve moves between lap and preliminary lap positions independently of said stop.

11. In a triple valve the combination of a triple piston; a slide valve actuated by said piston and having lost motion relatively to the piston; a graduating valve actuated by the piston; and a quick service measuring chamber, said triple valve being adapted for connection with brake pipe, brake cylinder and auxiliary reservoir; said slide valve having a service port controlled by the graduating valve and regulating flow from auxiliary reservoir to brake cylinder, a quick service port controlled by said graduating valve and when open causing venting of brake pipe to said measuring chamber, and a port for exhausting said measuring chamber to brake cylinder; said triple valve having three positions between which the graduating valve shifts while the slide valve remains substantially at rest, namely: service position in which the service and quick service ports are open and the chamber exhaust port is closed, lap position in which the service and quick service ports are closed and the chamber exhaust port is open, and preliminary lap position in which the quick service port is closed and the service port is throttled.

12. In a triple valve, the combination of a triple piston; a slide valve actuated by said piston and having lost motion relatively thereto; a graduating valve actuated by said piston; a quick service measuring chamber; a quick service valve controlling flow from the brake pipe to said measuring chamber; a piston for actuating said quick service valve; and a yielding graduating stop, said triple valve being adapted for connection with brake pipe, brake cylinder and auxiliary reservoir; said slide valve having a service port controlled by the graduating valve and regulating flow from the auxiliary reservoir to brake cylinder, and a quick service port controlled by said graduating valve controlling flow from the auxiliary reservoir to said quick service piston, and a port for exhausting said measuring chamber; said triple valve having three positions between which the graduating valve shifts while the slide valve remains substantially at rest, namely: a service position in which the service and quick service ports are open and the chamber exhaust port is closed, a lap position in which the service and quick service ports are closed and the chamber exhaust port is open, and a preliminary lap position between service and lap positions in which the quick service port is closed and the service port is throttled, said graduating stop being so located and so limited in its motion that the parts move between lap and preliminary lap positions without coacting with said stop.

13. In a triple valve, the combination of a triple piston; a slide valve actuated by said piston and having lost motion relatively thereto; a graduating valve actuated by said piston; a quick service measuring chamber; a quick service valve controlling flow from the brake pipe to said chamber; a quick service piston for actuating said valve, said piston being interposed in a quick service seat port controlled by said slide valve and leading to said measuring chamber, said piston making a leaky fit whereby air may pass the same at a limited rate; and means for sealing said piston at the limit of its motion in a valve opening direction, said triple valve being adapted for connection with brake pipe, brake cylinder and auxiliary reservoir; said slide valve having a service port controlled by the graduating valve and regulating flow from the auxiliary reservoir to brake cylinder, a quick service port controlled by said graduating valve and adapted to register in service position with the aforesaid quick service seat port, and a port capable of connecting the quick service seat port with exhaust; said triple valve having three positions between which the graduating valve shifts while the slide valve remains substantially at rest, namely: a service position in which the service and quick service ports are open and the chamber exhaust port is closed, a lap position in which the service and quick service ports are closed and the chamber exhaust port is open, and an intermediate preliminary lap position in which the quick service port is closed and the service port is throttled.

14. In a triple valve, the combination of a triple piston; a slide valve actuated by said piston and having lost motion relatively thereto; a graduating valve actuated by said piston; a quick service measuring chamber; a quick service valve controlling flow from the brake pipe to said chamber; a quick service piston for actuating said valve, said piston being interposed in a quick service seat port controlled by said slide valve and leading to said measuring chamber, said piston making a leaky fit whereby air may pass the same at a limited rate; means for sealing said piston at the limit of its motion in a valve opening direction; and a yielding graduating stop, said triple valve being adapted for connection with brake pipe, brake cylinder and auxiliary reservoir; said slide valve having a service port controlled by the graduating valve and regulating flow from the auxiliary reservoir to brake cylinder, a quick service port controlled by said graduating valve and adapted to register in service position with the aforesaid quick service seat port, and a port capable of connecting the quick service seat port with exhaust; said triple valve having three positions between which the graduating valve shifts while the slide valve remains substantially at rest, namely: a service position in which the service and quick service ports are open and the chamber exhaust port is closed, a lap position in which the service and quick service ports are closed and the chamber exhaust port is open, and an intermediate preliminary lap position in which the quick service port is closed and the service port is throttled, the graduating stop being so located and so limited in its motion that the parts move between lap and preliminary lap positions without engaging said stop.

15. The combination of a triple valve including a slide valve and a graduating valve, said valves having a quick service position in which the brake pipe is vented, a service position in which auxiliary reservoir air is fed to the brake cylinder, a preliminary lap position in which the quick service brake pipe venting is cut off and service flow to brake cylinder is throttled, and a lap position in which the service flow to brake cylinder is terminated; and a yielding graduating stop adapted to arrest said triple valve in quick service position, then to yield and permit it to move to service position, and thereafter upon approach to equalization of brake pipe and auxiliary reservoir pressures to assist in shifting said triple valve to preliminary lap position, said stop being so limited in its motion as to cease to react when the valve reaches the last-named position.

16. The combination of a triple valve including a slide valve, and a graduating valve, said valves having a quick service position in which the brake pipe is vented, a service position in which auxiliary reservoir air is fed to the brake cylinder, and a lap position in which both quick service and service flow are cut off; and a yielding graduating stop adapted to arrest said triple valve in quick service position, then to permit it to move to service position, and operative thereafter to urge said triple valve toward lap position upon approach to equalization between auxiliary reservoir and brake pipe pressures, said yielding stop being so limited in its motion that it ceases to react against the piston before the triple valve arrives in lap position.

17. A triple valve comprising in combination a triple piston; a slide valve having a lost motion connection with the triple piston; a graduating valve actuated by said piston, said slide valve having a service port formed with a restricted extension, said port and extension being controlled by the graduating valve, said slide valve also having a quick service port controlled by the graduating valve; and a yielding graduating stop, the triple valve having a quick service position in which the piston engages the graduating stop without overpowering it and in which said service port is at least partially open and said quick service port is open, a full service position in which the graduating stop is overpowered and in which said service port is open and said quick service port is at least partially open, a preliminary service lap position in which the piston has been shifted to the limit of motion of the graduating stop toward release position and in which the graduating valve closes the quick service port and closes said service port except for said restricted extension.

18. A triple valve, comprising in combination a triple piston; a slide valve and seat; and at least one additional valve related to the slide valve and moved relatively thereto by the triple piston; said triple valve having two release positions from one of which the slide valve is moved and from the other of which the slide valve is not moved in shifting to quick service position, said related valve moving relatively to said slide valve in such shifting, said triple valve further having a lap position and a quick service position between which said related valve moves while the slide valve remains at rest.

19. A triple valve for connection with brake pipe, brake cylinder and auxiliary reservoir, comprising in combination a triple piston; a slide valve actuated with lost motion by said piston and having a quick service port which communicates with a quick service port in the seat when the slide valve is in a release position; a graduating valve actuated by said piston and arranged to close the quick service port in the slide valve against flow from auxiliary reservoir in said release position and to open it by motion of the graduating valve toward service position; a quick service measuring chamber; a quick service valve controlling flow from the brake pipe to said chamber; and a quick service piston for actuating said quick service valve and operable by auxiliary reservoir pressure admitted through said quick service seat port; said slide and graduating valve having ports which in release position connect said quick service seat port to exhaust, and said quick service piston in its inactive position offering a restricted connection between the measuring chamber and the quick service seat port.

20. A triple valve for connection with brake pipe, brake cylinder and auxiliary reservoir, comprising in combination a triple piston; a slide valve actuated with lost motion by said piston and having a quick service port which communicates with a quick service port in the seat when the slide valve is in a release position; a graduating valve actuated by said piston and arranged to close the quick service port in the slide valve against flow from auxiliary reservoir in said release position and to open it by motion of the graduating valve toward service position; a quick service measuring chamber; a quick service valve controlling flow from the brake pipe to said chamber; and a quick service piston for actuating said quick service valve and operable by auxiliary reservoir pressure admitted through said quick service seat port; said slide and graduating valve having ports which in release position and lap position connect said quick service seat port to exhaust, and said quick service piston in its inactive position offering a restricted connection between the measuring chamber and the quick service seat port.

21. The combination of a triple valve of the quick service venting type, having a triple piston, and including a passage which connects the space at one side of the triple piston with brake pipe, from which passage air is vented in quick service; and throttling means interposed between said passage and the brake pipe.

22. The combination of a triple valve including a triple piston, a slide valve mechanism actuated thereby, and a piston operated quick service vent valve rendered active by motion of said slide valve mechanism, there being a passage which is adapted to subject the triple piston to brake pipe pressure, and from which the quick service valve functions to vent air; and throttling means interposed between said passage and the brake pipe.

23. The combination of an automatic brake valve of the quick service venting type, adapted for connection with brake pipe, brake cylinder and auxiliary reservoir, said automatic valve comprising an actuating abutment responsive to pressure differentials between brake pipe and auxiliary reservoir, a slide valve and a graduating valve moved relatively to each other by motion of said abutment, said valves being so ported that motion of the graduating valve from release toward service position while the slide valve remains at rest, establishes a venting connection from the brake pipe; and throttling means interposed between the brake pipe, on the one hand, and said abutment and venting connection, on the other hand.

24. In a fluid pressure brake, the combination of a brake pipe; a triple valve device comprising a main valve, a graduating valve having a movement relatively to the main valve, and a piston operated upon a reduction of brake pipe pressure for operating said valves; means operative upon movement of said graduating valve relatively to the main valve, to vent brake pipe air from a point adjacent said piston; and a flow retarding restricting means interposed between said point and the brake pipe.

25. In a fluid pressure brake, the combination with a brake pipe and a triple valve device, said triple valve device comprising a main valve, a graduating valve having a movement relative to the main valve from service lap position to service position, and a piston operated upon a reduction in brake pipe pressure for shifting said graduating valve from service lap position toward service position, of means operative upon movement of the graduating valve from service lap position toward service position for establishing a communication through which fluid under pressure is supplied to increase the degree of brake application, means operated upon further movement of the graduating valve from service lap toward service position, for establishing a communication through which fluid under pressure is vented from the brake pipe, and means for yieldingly opposing movement of the piston and thereby the graduating valve toward service position after the first-mentioned communication has been established, and before the second-mentioned communication is established.

26. In a fluid pressure brake, the combination with a brake pipe and a triple valve device having a service position and a service lap position, said triple valve device comprising a main valve, a graduating valve having a movement relative to the main valve from service lap position to service position, and a piston operated upon a reduction of brake pipe pressure for shifting said graduating valve from service lap position toward service position, of means operative upon movement of the graduating valve from service lap position toward service position for establishing a communication through which fluid under pressure is supplied to increase the degree of brake application, means operative upon further movement of the graduating valve from service lap toward service position for establishing a communication through which fluid under pressure is vented from the brake pipe, and means operative after the first-mentioned communication has been established and before the second-mentioned communication is established for yieldably opposing movement of the piston and thereby the graduating valve toward service position.

27. In a fluid pressure brake the combination of a brake pipe and a triple valve device having a service position and a service lap position, said triple valve device comprising a slide valve and a graduating valve having a movement relatively to the slide valve from service lap position to service position, and a piston operated upon a reduction of brake pipe pressure for shifting said graduating valve from service lap position toward service position, of a service port and a quick service port in the slide valve, both controlled by the graduating valve, said ports being so arranged that as the graduating valve moves from service lap toward service position the service port is at least partially opened before the quick service port is opened, and means operative after such opening of the service port has occurred and before opening of the quick service port has occurred for yieldably opposing movement of the piston and thereby the graduating valve toward service position.

28. The combination with a triple valve of the quick service type, of means for preventing the triple valve from creeping from lap to quick service position, said means comprising a port opened by initial movement from lap position toward quick service position and serving to reduce auxiliary reservoir pressure at a rate which will neutralize the effect of brake pipe leakage on the triple valve; and means effective after said port is open for yieldably resisting movement of the triple valve toward quick service position.

29. In a fluid pressure brake, the combination with a brake pipe and a triple valve device operative upon a reduction in brake pipe pressure to effect an application of the brakes and operative upon an increase in brake pipe pressure to effect a release of the brakes, of quick service means controlled by said triple valve device and operative to effect a local quick service reduction in brake pipe pressure, said quick service means comprising a quick service chamber, valve means operative to vent fluid under pressure from said brake pipe to said quick service chamber, a movable abutment for effecting the operation of said valve means, said triple valve device being operative upon a reduction in brake pipe pressure to supply fluid under pressure to said abutment for operating same, said triple valve device being operative upon an increase in brake pipe pressure to vent fluid under pressure from said abutment, and means controlled by said abutment for venting fluid under pressure from said quick service chamber upon the venting of fluid under pressure from said abutment.

30. In a fluid pressure brake, the combination with a brake pipe, and a triple valve device operative upon a reduction in brake pipe pressure to effect an application of the brakes and operative upon an increase in brake pipe pressure to effect a release of the brakes, of quick service means controlled by said triple valve device and operative to effect a local quick service reduction in brake pipe pressure, said quick service means comprising a quick service chamber, valve means operative to vent fluid under pressure from said brake pipe to said quick service chamber, a movable abutment for effecting the operation of said valve means, said abutment being open at one side to said quick service chamber and having at the opposite side a chamber, said triple valve device being operative upon a reduction in brake pipe pressure to supply fluid under pressure to the last mentioned chamber for operating said abutment to vent fluid under pressure from said brake pipe, said triple valve device being operative upon an increase in brake pipe pressure to vent fluid under pressure from the last-mentioned chamber, and means controlled by the movement of said abutment upon venting fluid under pressure from the last mentioned chamber for venting fluid under pressure from said quick service chamber.

31. In a fluid pressure brake, the combination with a brake pipe, of valve means comprising a movable abutment operative by fluid under pressure for effecting a local quick service reduction in pressure in said brake pipe, said abutment having a chamber at one side, and a triple valve device comprising a main slide valve, an auxiliary slide valve movably mounted on said main slide valve and cooperative therewith for at one time establishing a communication from said chamber to the atmosphere, said auxiliary slide valve being movable relative to said main slide valve to close said communication and to establish another communication through which fluid under pressure is supplied to said chamber for operating said abutment, and a piston subject to the pressure of fluid in said brake pipe and operative upon a reduction in brake pipe pressure to move said auxiliary slide valve relative to said main slide valve.

CHARLES A. CAMPBELL.